United States Patent
Moioli et al.

(10) Patent No.: US 12,525,840 B2
(45) Date of Patent: Jan. 13, 2026

(54) FLUID COOLED ELECTRIC MACHINE

(71) Applicant: ABB Schweiz AG, Baden (CH)

(72) Inventors: Giuseppe Moioli, Paderno Dugnano (IT); Giulio Secondo, Genoa (IT); Michele Lorenzo Maggi, Pavia (IT)

(73) Assignee: ABB SCHWEIZ AG, Baden (CH)

(*) Notice: Subject to any disclaimer, the term of this patent is extended or adjusted under 35 U.S.C. 154(b) by 0 days.

(21) Appl. No.: 17/573,361

(22) Filed: Jan. 11, 2022

(65) Prior Publication Data

US 2022/0224190 A1 Jul. 14, 2022

(30) Foreign Application Priority Data

Jan. 11, 2021 (EP) .................................. 21150939

(51) Int. Cl.
*H02K 5/20* (2006.01)
*H02K 5/15* (2006.01)
*H02K 9/193* (2006.01)

(52) U.S. Cl.
CPC .............. *H02K 5/203* (2021.01); *H02K 5/15* (2013.01); *H02K 9/193* (2013.01)

(58) Field of Classification Search
CPC .......... H02K 5/203; H02K 9/193; H02K 9/10; H02K 9/12; H02K 5/15
USPC .......................... 310/54, 58, 59, 60 R, 61, 62
See application file for complete search history.

(56) References Cited

U.S. PATENT DOCUMENTS

| | | | |
|---|---|---|---|
| 2009/0026858 A1* | 1/2009 | Knauff | H02K 1/20 310/59 |
| 2014/0042841 A1* | 2/2014 | Rippel | H02K 9/193 310/54 |
| 2015/0280525 A1 | 10/2015 | Rippel et al. | |

FOREIGN PATENT DOCUMENTS

| | | | | |
|---|---|---|---|---|
| CN | 208638160 U | * | 3/2019 | |
| CN | 109617292 A | * | 4/2019 | ............. H02K 5/18 |
| CN | 110289723 A | * | 9/2019 | ............. H02K 9/19 |
| DE | 10005128 A1 | * | 8/2001 | ............. H02K 5/203 |
| DE | 19757605 C2 | * | 3/2003 | ............. H02K 1/32 |
| DE | 102005002564 A1 | * | 8/2006 | |
| DE | 102011076904 A1 | * | 12/2012 | ............. H02K 1/146 |
| EP | 1499001 | * | 1/2005 | |
| EP | 1499001 A1 | | 1/2005 | |
| EP | 3079239 A1 | * | 10/2016 | ............. H02K 9/197 |

OTHER PUBLICATIONS

European Extended Search Report, Application No. 21150939.3, dated Jun. 29, 2021, 10 pps.

(Continued)

*Primary Examiner* — Jose A Gonzalez Quinones
(74) *Attorney, Agent, or Firm* — Michael M. Gnibus; McCarter & English, LLP

(57) ABSTRACT

The present disclosure relates to a fluid cooled electric machine, and a method for producing the same. The fluid cooled electric machine includes a shaft extending along an axis of the machine, a rotor rotationally coupled to the shaft, a stator radially surrounding the rotor and having a stator core, first and second end shields mounted at opposite ends of the electric machine in the axial direction, and a fluid cooling system for cooling the electric machine, the stator core having a plurality of axial cavities, the fluid cooling system including first and second collector bodies, each including a plurality of collector chambers for the fluid, and a plurality of pipes.

13 Claims, 8 Drawing Sheets

(56) References Cited

OTHER PUBLICATIONS

European Office Action for Application No. 21150939.3, dated Mar. 26, 2025, 7 pages.

* cited by examiner

FLUID COOLED ELECTRIC MACHINE

CROSS REFERENCE TO RELATED APPLICATIONS

This patent application claims the benefit and priority of European Patent Application No. 21150939.3 filed on Jan. 11, 2021, the disclosure of which is incorporated by reference herein in its entirety as part of the present application.

BACKGROUND

The present disclosure relates to a fluid cooled electric machine, and a method for producing the same. More specifically, the present disclosure relates to a fluid cooled electric machine including a shaft extending along an axis of the machine, a rotor rotationally coupled to the shaft, a stator radially surrounding the rotor and having a stator core, first and second end shields mounted at axially opposite ends of the machine, and a cooling system, and to a method for producing the same.

Air cooled electric machines generally include a shaft extending along an axis of the machine, a rotor rotationally coupled to the shaft, a stator radially surrounding the rotor and having a stator core, first and second end shields mounted at axially opposite ends of the machine. Air cooled machines are generally less complex and less expensive to produce than fluid cooled machines.

In contrast, fluid cooled electric machines, which use a cooling fluid such as water, can more effectively remove heat from the machine, and thereby provide increased performance, such as higher output power, speed, torque, and durability, with a smaller layout than air cooled machines.

One type of fluid cooled electric machine is a water cooled electric motor which includes a single welded and rounded pipe wrapped around the stator core, through which water flows to cool the motor. However, such a design requires the production of a suitably shaped pipe, which gives rise to increased production steps and increased costs.

Fluid cooled electric machines which are based on existing designs of an air cooled electric machines, are also known.

One example of such a fluid cooled electric machine is a water cooled electric motor which includes specialized end shields having dedicated water chambers, and several pipes connected at their ends to the end shields, to form a path for the flow of water. However, this design has the disadvantage that specially engineered end shields are required, which are more complex than the end shields of an existing air cooled design. This design has the further drawback that it becomes necessary to use a special material, such as a cast iron material used for hydraulic applications, which does not leak fluid under pressure, to form the end shields, thus increasing costs. Accordingly, such an end-shield lacks modularity, because it is specific to water cooled motors and cannot be applied to air cooled motors.

BRIEF DESCRIPTION

In view of the above, embodiments of the present disclosure provide a fluid cooled electric machine and a method of producing the same.

According to an aspect of the present disclosure, a fluid cooled electric machine includes a shaft extending along an axis of the machine, a rotor rotationally coupled to the shaft, a stator radially surrounding the rotor and having a stator core, first and second end shields mounted at opposite ends of the machine in the axial direction, and a fluid cooling system for cooling the electric machine, the stator core having a plurality of axial cavities. The cooling system includes first and second collector bodies, each including a plurality of collector chambers for the fluid, and a plurality of pipes, wherein the first collector body is mounted, as a separate piece, between a first end of the stator core and the first end shield, the second collector body is mounted, as a separate piece, between a second end of the stator core and the second end shield, each pipe is mounted in the axial cavities of the stator core, and interconnects a collector chamber of the first collector body and a collector chamber of the second collector body.

According to a further aspect of the disclosure, the fluid cooled electric machine is produced by a method including the steps of mounting the pipes in the axial cavities of the stator core, mounting the first collector body to a first end of the stator core, and mounting the second collector body to a second end of the stator core, so that the pipes interconnect the connecting chambers of the first and the second collector bodies, and mounting the first end shield to the first collector body, and mounting the second end shield to the second collector.

The fluid cooled electric machine may reduce at least some of the drawbacks of the background art described above. In particular, the fluid cooled electric machine may be produced in a modular manner using a limited number of components. Particularly advantageously, the fluid cooled electric machine may be produced using common components with an air cooled electric machine, and/or can be retrofitted from an existing air cooled electric machine. In particular, the fluid cooled electric machine may be readily produced by adding simple components to an existing design of an air cooled electric machine. Thereby, a minimum of specialized components or specialized tools, and only simple production steps may be required.

BRIEF DESCRIPTION OF THE DRAWINGS

The subject matter of the disclosure will be explained in more detail in the following text with reference to exemplary embodiments which are illustrated in the attached drawings.

DETAILED DESCRIPTION

An embodiment of an electric machine 1 including a fluid cooling system 10 according to the present disclosure is described in the following with reference to the figures.

Figure 1:
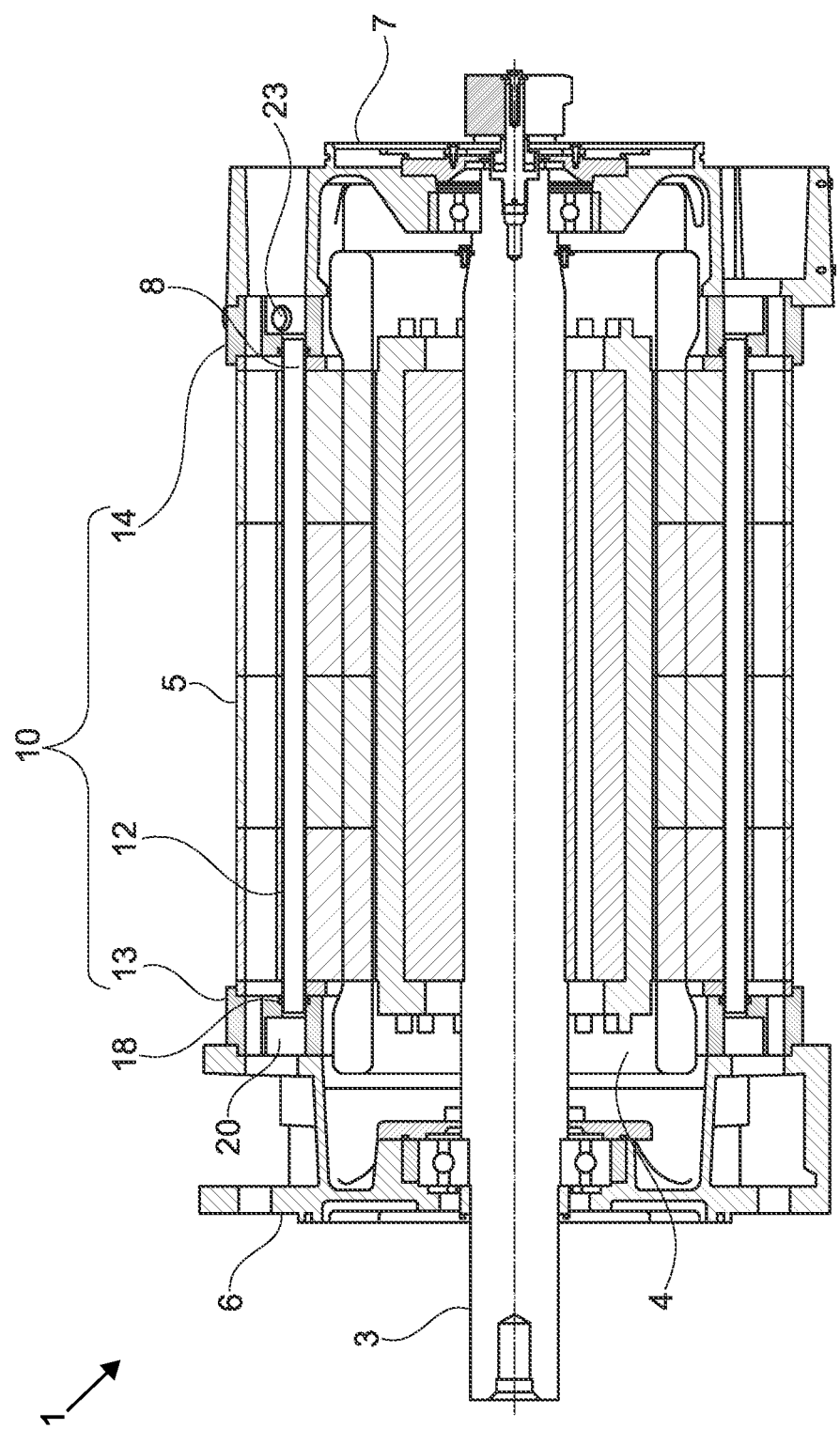
FIG. 1 is a cross sectional view of components of a fluid cooled electric motor of an embodiment of the present disclosure, cut along the axis of the electric motor.

As shown in FIG. 1, the electric machine 1 of the present embodiment is a water-cooled motor, which is produced from an existing design of an air cooled motor, by adding simple components to the existing design, without requiring modification or replacement of the rotor, stator, or end shields of the existing design. Hence, the rotor, stator, and end shields of the present embodiment are the same ones used for the existing air-cooled motor.

Figure 8:
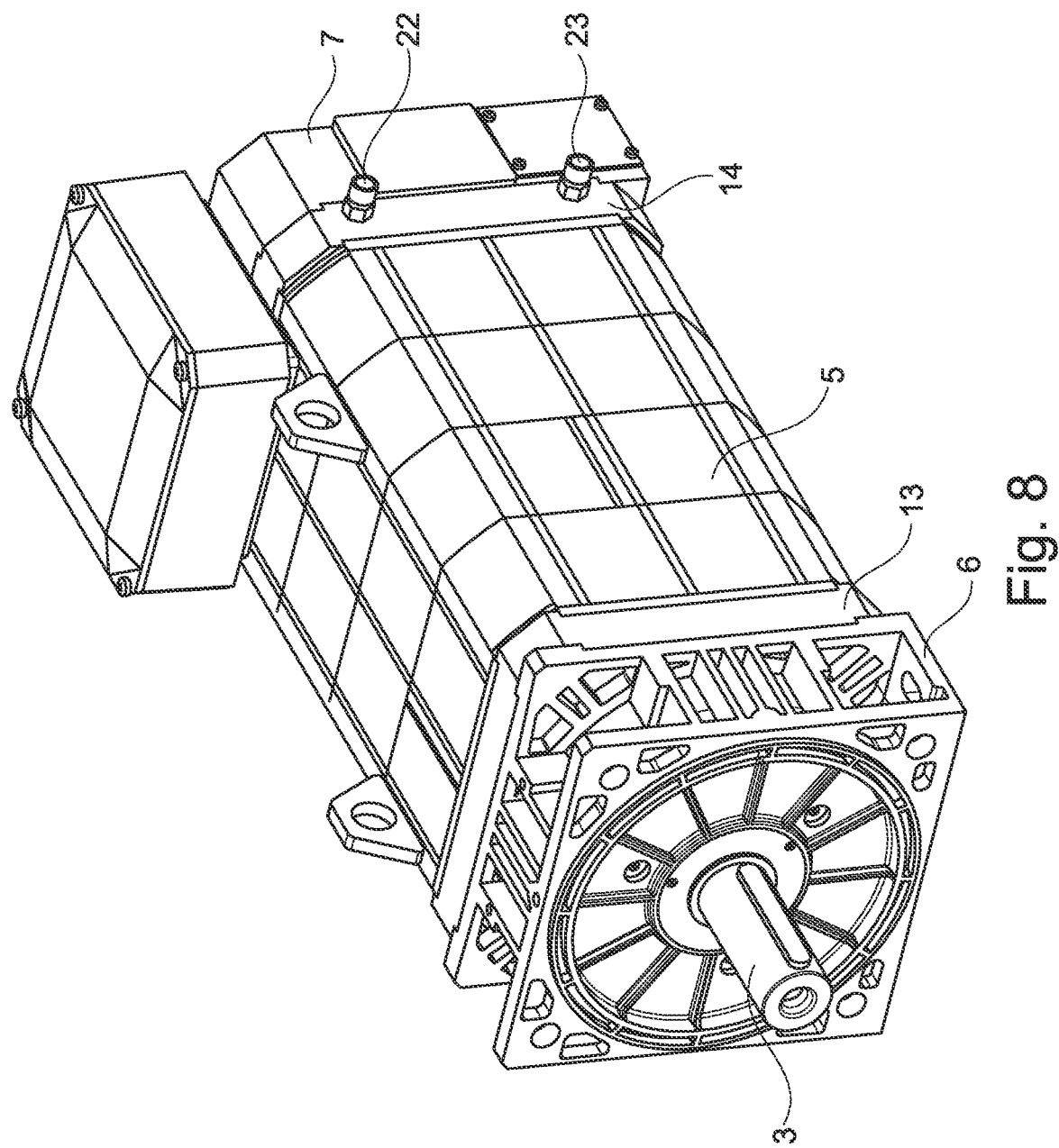
FIG. 8 is an exterior view of the electric motor of the present disclosure.

An oblique view of the exterior of an electric motor is shown in FIG. 8.

The electric machine 1 of the present embodiment includes a shaft 3, a rotor 4, a stator core 5, a drive-end end shield 6, and a non-drive-end end shield 7. The shaft 3 is supported by bearings in the end shields 6,7 and protrudes from an opening of the drive-end end shield 6.

Figure 2:
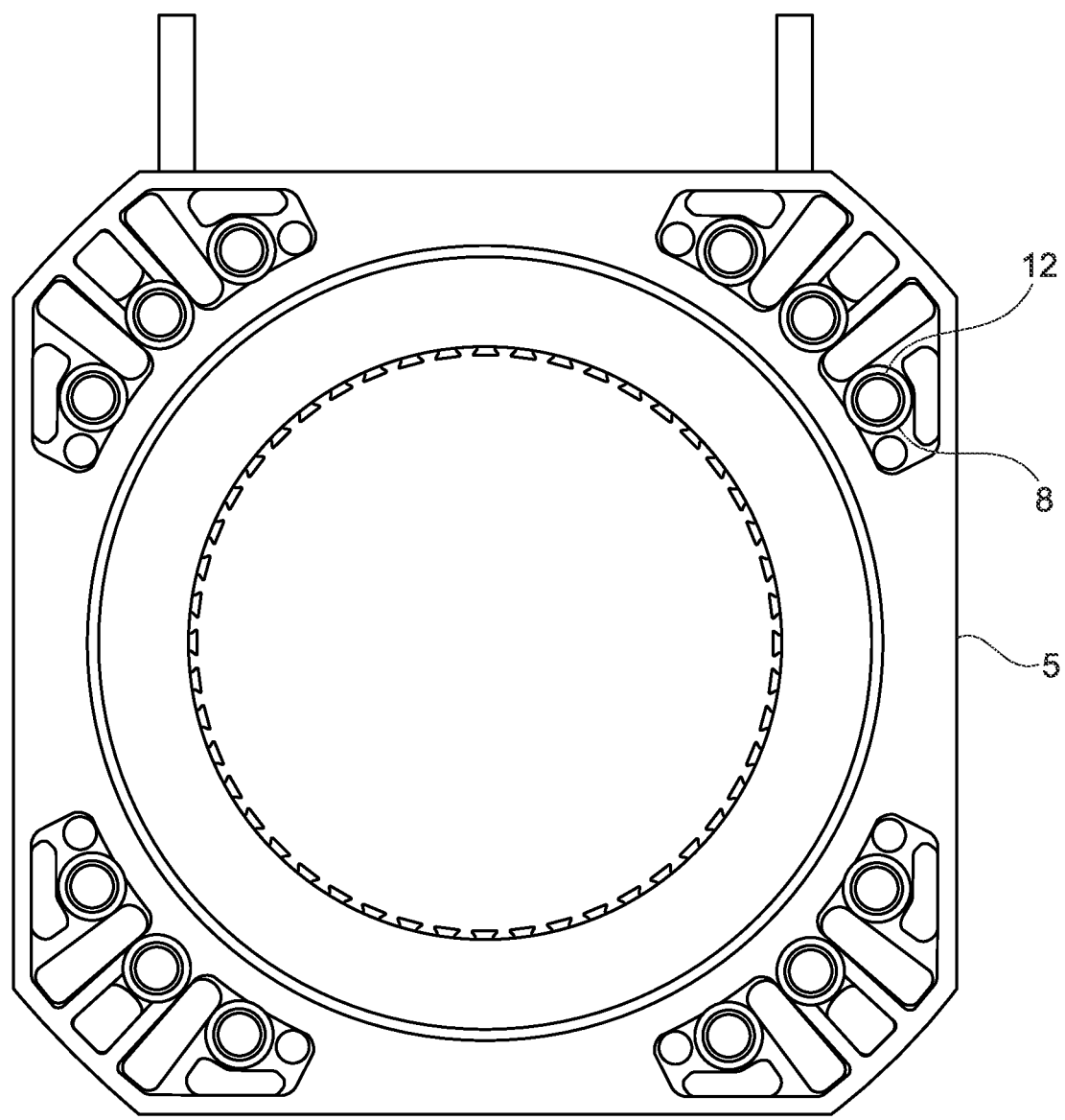
FIG. 2 is a cross sectional view of a stator core of an embodiment of the present disclosure, cut perpendicular to the axis.

FIG. 2 is a cross sectional view of the 13 stator core 5 cut perpendicular to the axis of the machine. As shown in FIG. 2, the stator core 5 of the present embodiment has an inner opening which accommodates the shaft 3 (not shown) and rotor 4 (not shown), and projections which project towards the axis, and support the windings (not shown) of the stator. The outer periphery of the stator core 5 has the shape of a square with truncated corners. The stator core 5 includes through-holes 8 which extend parallel to the axis of the machine. These through-holes 8 are arranged in the vicinity of the truncated corners of the square cross section. In the present embodiment, there are three through-holes 8 provided near each corner.

In the water-cooled motor of the present embodiment, pipes 12, which are part of the cooling system 10, are provided in the through-holes 8. These pipes 12 provide a fluid-sealed path for flow of the cooling water. In the present embodiment, pipes 12 are included in all three of the through-holes 8 near each corner.

Figure 3:
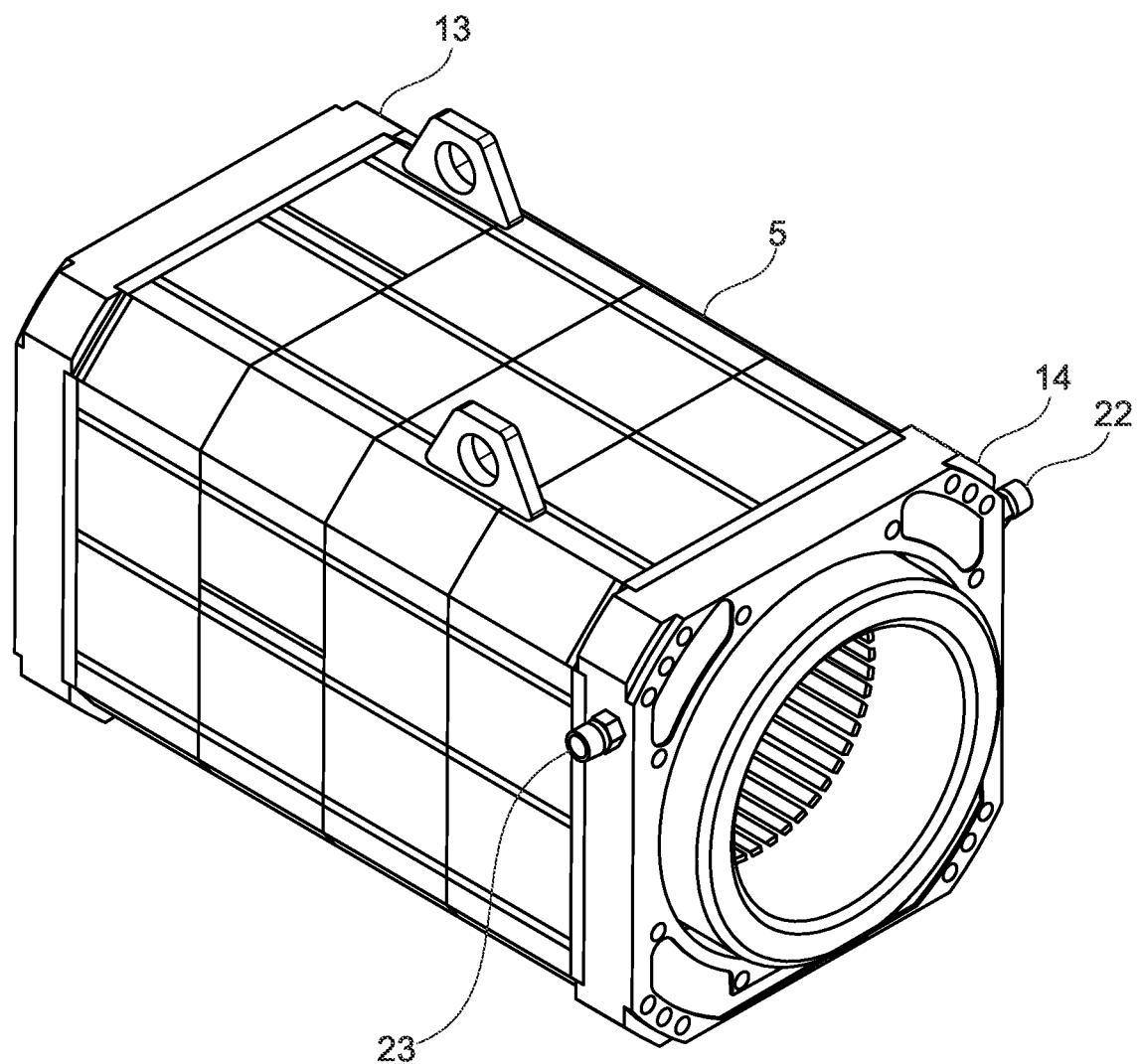
FIG. 3 is an oblique view of components of an embodiment of the present disclosure.
Figure 4:
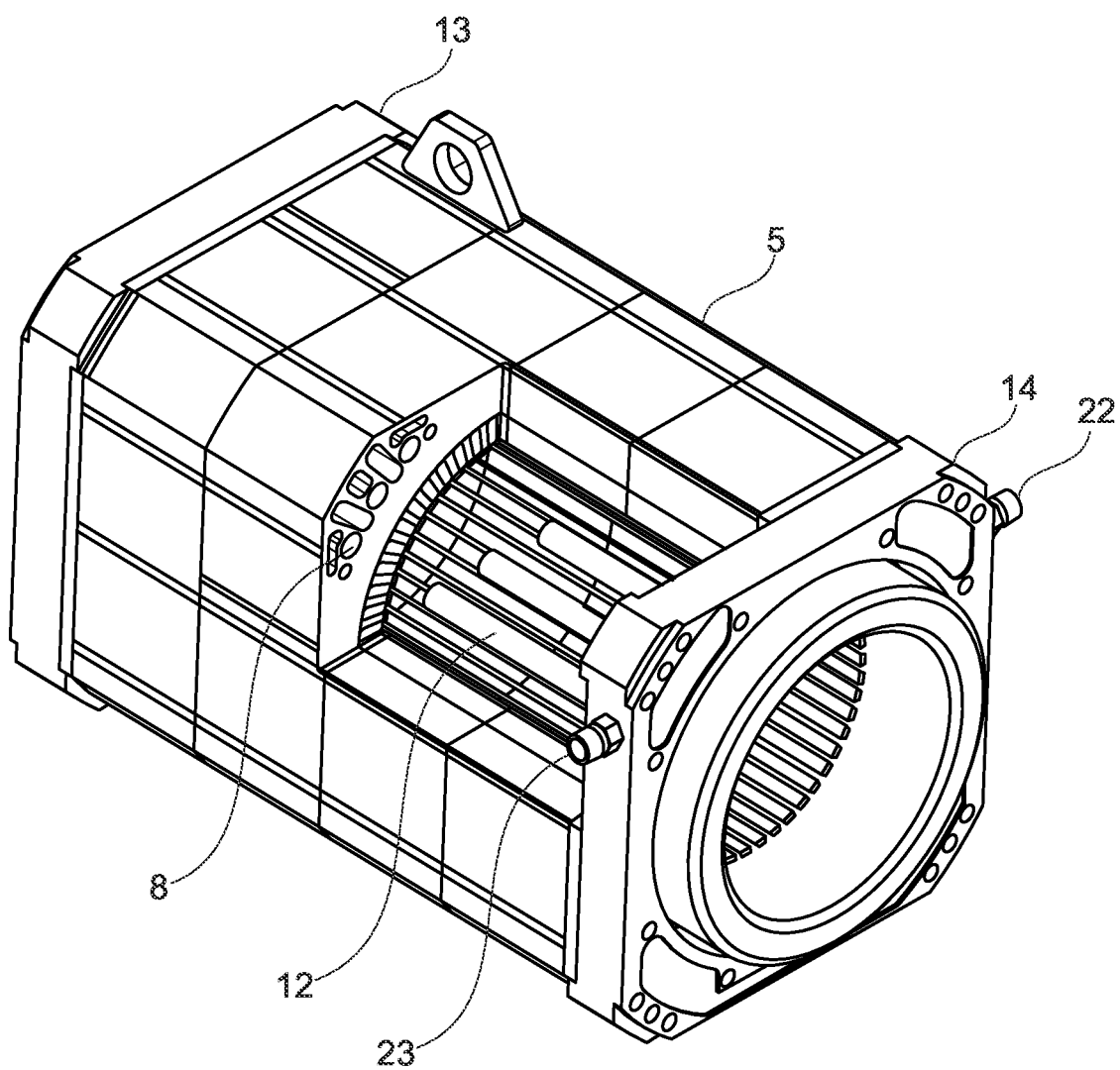
FIG. 4 is a partially cut-out, oblique view of components of an embodiment of the present disclosure.

FIG. 3 is an oblique view showing components of the present embodiment, including the stator core 5, and collector bodies 13,14. FIG. 4 shows the same view as FIG. 3, but in FIG. 4 part of the stator core 5 is cut away to reveal the pipes 12 inside the stator core. Also, in FIG. 4, parts of the pipes are cut away to reveal the through-holes 8.

Figure 5B:
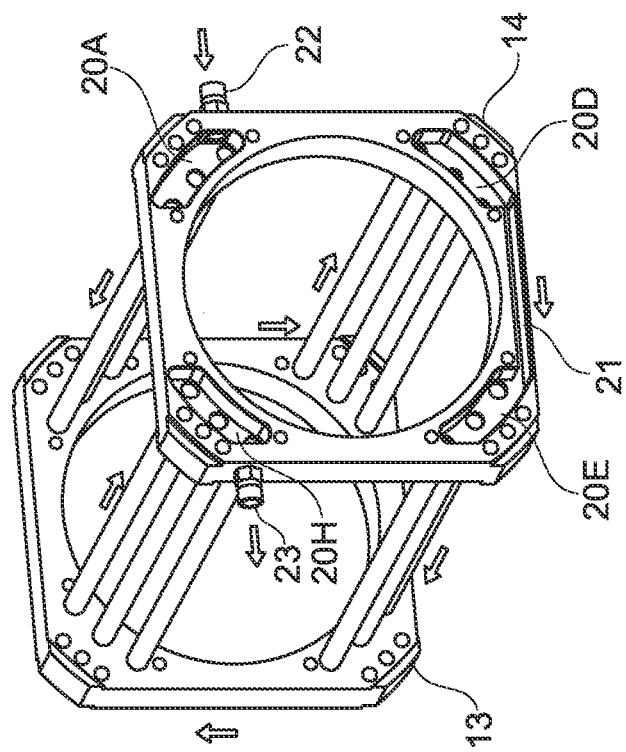
FIGS. 5A and 5B is an oblique view of the cooling system of an embodiment of the present disclosure.
Figure 5A:
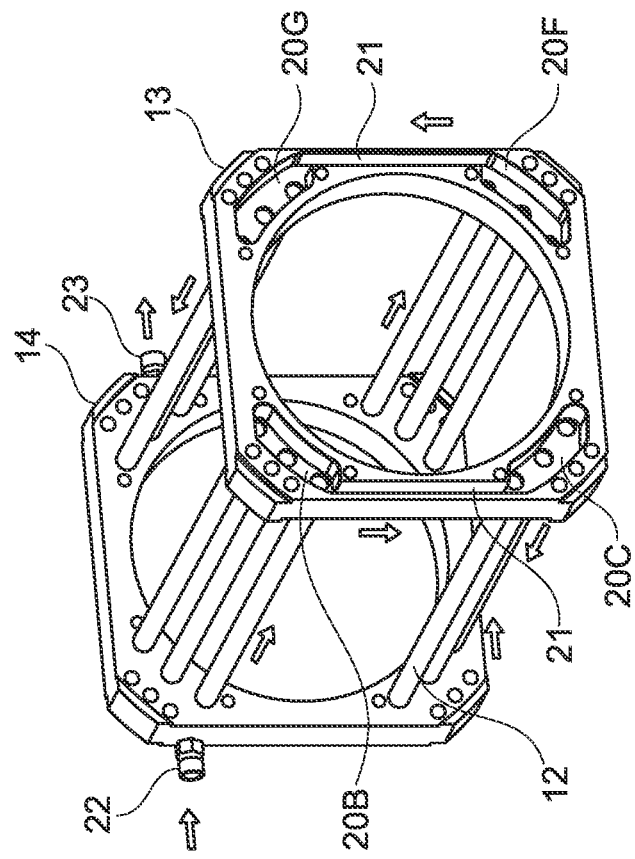

FIGS. 5A and 5B are oblique views showing the cooling system 10 of the present embodiment. FIG. 5A shows the cooling system 10 with the collector body 13 closest to the viewer; FIG. 5B shows the cooling system 10 with the collector body 14 closest to the viewer. In FIGS. 5A and 5B, the portions of the collector chambers 20 and fluid channels 21 are cut open to illustrate the fluid flow. Fluid is input under pressure into the fluid inlet 22 of the collector body 14. The means for supplying pressurized cooling fluid to the fluid inlet 22 are provided by the user of the motor, and are not shown. The arrows illustrate the flow of fluid. As shown by the arrows, the cooling fluid flows into fluid inlet 22, and sequentially flows through collector chambers 20A, 20B, 20C . . . 20H via the pipes 12 and fluid channels 21, and out of the fluid outlet 23.

More specifically, the cooling fluid flows through the fluid inlet 22 into the first collector chamber 20A of the collector body 14. From the first collector chamber 20A, the fluid flows through pipes 12, into a second collector chamber 20B of the collector body 13. From the collector chamber 20B, the fluid flows through the fluid channel 21 into a third collector chamber 20C of collector body 13, and from there flows through the pipes 12 into a fourth collector chamber 20D of collector body 14. The fluid then continues to flow through other fluid channels, collector chambers, and pipes as illustrated by the arrows, until it reaches the fluid outlet 23. Along this path, the cooling fluid absorbs heat from the stator core 5 (not shown). The warmer fluid emerging from the fluid outlet 23 can be cooled and recirculated to the fluid inlet 22 by a circulating system (not shown) provided by the user of the electric machine.

Thus, the cooling fluid flows axially from collector chamber 20A of collector body 14 to collector chamber 20B of collector body 13 in a first axial direction through pipes 12. Then the cooling fluid flows through fluid channel 21 of collector body 13, to collector chamber 20C of collector body 13. From collector chamber 20C, the cooling fluid flows through pipes 12 to collector chamber 20D of collector body 14, in a second axial direction which is opposite to the first axial direction, as shown by the arrows in FIGS. 5A and 5B. Then, the cooling fluid flows through fluid channel 21 to collector chamber 20E, and then flows through pipes 12 to collector chamber 20F of collector body 13, in the first axial direction. Then, the cooling fluid flows through fluid channel 21 of collector body 13 to collector chamber 20G of collector body 13. Then, the cooling fluid flows from collector chamber 20G to collector chamber 20H of collector body 14 in the second axial direction.

Figure 6:
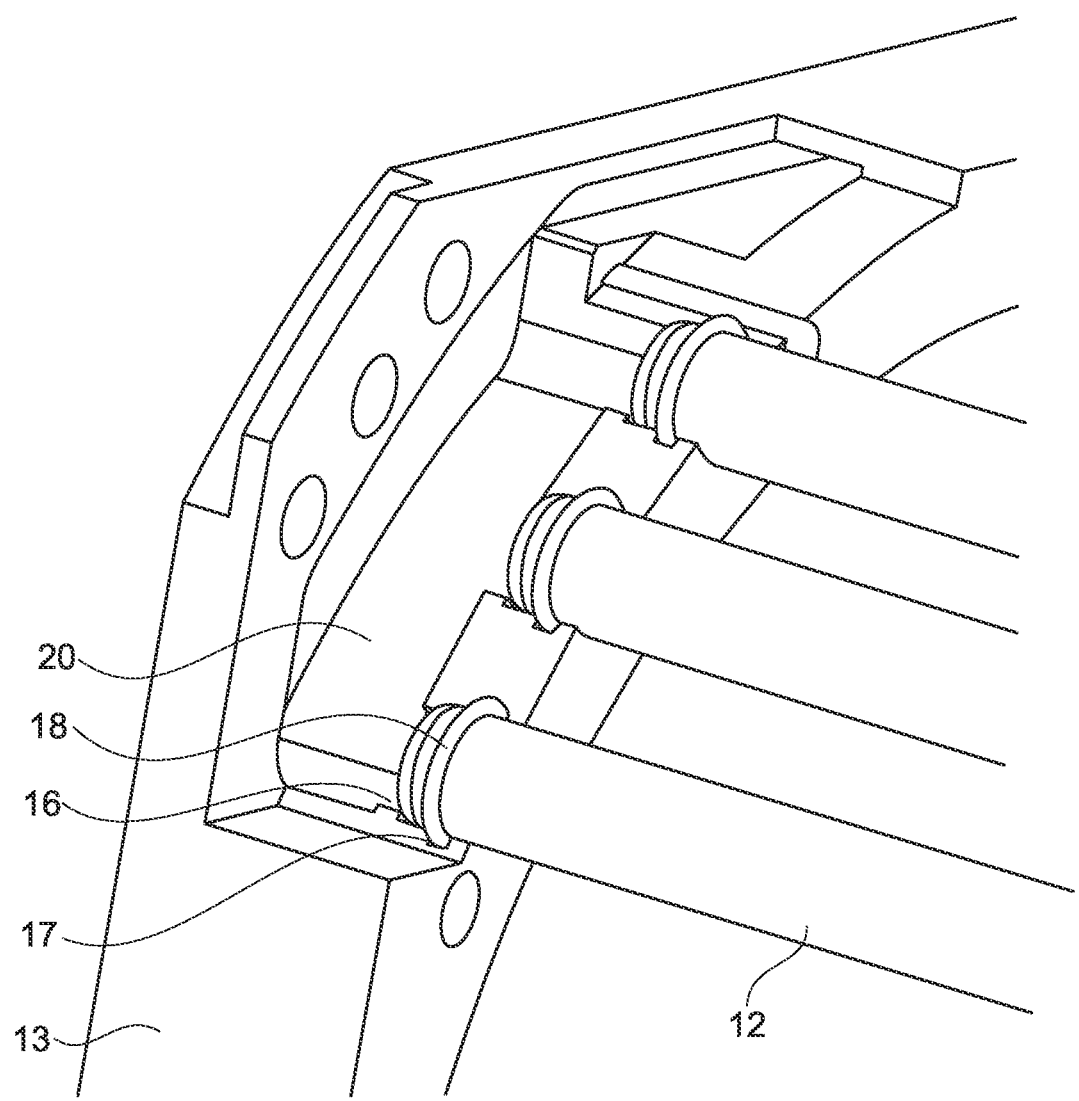
FIG. 6 is a partially cut-out, oblique view showing a portion of an embodiment of the present disclosure.

FIG. 6 is an oblique view showing a portion of the collector body 13 and pipes 12, with a cutout showing the collector chamber 20 and connecting hole 16 inside the collector body 13. As shown in FIG. 6, the connecting hole 16 includes a groove 17 for accommodating the seal ring 18. The seal ring 18 provides a fluid-sealed connection between the pipe 12 and the connecting hole 16. As shown in FIG. 6, one side of the connecting hole 16 opens to the face of the collector body 13 to allow insertion of the pipes 12, while the other side of the connecting hole 16 opens to the collector chamber 20, thereby connecting the pipe 12 and the collector chamber 20 to allow the flow of fluid.

In the following, general aspects of the present disclosure are described in detail. The description uses reference signs found in the figures, but these reference signs are only used for illustration and the aspects are not limited to the embodiments shown in the figures.

According to an aspect of the present disclosure, the fluid cooled electric machine can be readily produced based on existing designs of air cooled electric machines. Such existing air-cooled electric machines generally include a shaft extending along an axis of the machine, a rotor rotationally coupled to the shaft, a stator radially surrounding the rotor and having a stator core, and first and second end shields mounted at axially opposite ends of the machine, and the electric machine of the present disclosure can utilize these components of an air-cooled electric machine without modification.

One example of such an electric machine of the present disclosure is an electric motor. Another example is a generator.

According to an aspect of the present disclosure, the shaft 3 of the fluid cooled electric machine 1 protrudes from the drive end of the electric machine, and rotates about an axis. In the present description, the axis of rotation of the shaft is referred to as the axis of the electric machine, and "axial" or "axially" generally refers to a line which is parallel to the axis of the electric machine.

According to an aspect of the present disclosure, the rotor 4 is rotationally coupled to the shaft, so that the shaft and rotor rotate as a unit.

According to an aspect of the present disclosure, the stator radially surrounds the rotor, and includes a stator core 5. The stator core 5 includes cavities 8 extending axially. Such cavities are generally present in existing designs of air cooled machines, for air cooling. One example of such cavities are through-holes extending axially through the stator core 5. Another example of such cavities are spaces such as axial channels formed between adjacent cooling fins.

According to an aspect of the present disclosure, pipes 12 are inserted into these cavities 8 for cooling the electric machine. Cooling fluid runs inside the pipes 12 to cool the electric machine. The pipes 12 are closely in contact with the cavities 8 of the stator core 5, in order to transfer heat from metallic parts, such as lamination sheets of the stator core 5 and the pipes 12, to the cooling fluid. Because the cavities 8 extend axially, it is possible to insert straight pipes. In this way, the present disclosure does not require cooling pipes having a complicated shape which wrap around the electric machine.

According to an aspect of the present disclosure, the shape of the cross section of the outer periphery of the stator core 5 is not particularly limited, and for example, may be may be round, square, or approximately square, such as a square with rounded corners, or truncated corners as shown in FIG. 2. In this case, the cavities may be arranged near the corners of the square, as shown in FIG. 2, in order to take advantage of the larger available cross-sectional space in this part of the stator.

According to an aspect of the present disclosure, the end shields 6,7 of the electric machine are provided at both axial ends of the electric machine. The end shields 6,7 provide a cover for the axial ends of the stator's inner space in which the rotor is provided, while leaving an opening for the shaft, at least at the drive-end end shield 6, and also strengthen the structure the electrical machine. The drive-end end shield 6 is mounted to the drive end of the electric machine. The non-drive-end end shield 7 is mounted to the non-drive-end of the electric machine.

According to an aspect of the present disclosure, the end shields 6,7 generally include bearing seats which rotationally support the rotor. The end shields 6,7 may also have integrated feet, to support the electric machine, and/or a flange for fixing the electric machine to a base plate.

According to an aspect of the present disclosure, in the fluid cooled electric machine of the present disclosure, the rotor 4, stator and stator core 5, and end shields 6,7 are the same as the rotor, stator and stator core, and end shields used in an already existing design of an air cooled electric machine. In this way, the fluid cooled electric machine of the present disclosure requires a minimum of new components, and can be readily produced based on an existing design of an air cooled electric machine.

The fluid cooling system 10 includes pipes 12, and first and second collector bodies 13,14 each including collector chambers 20 for the fluid.

According to an aspect of the present disclosure, the fluid cooling system 10 is a stand-alone system. This means that the first and second collector bodies 13,14 and pipes 12 are made of separate parts, separate from the other components of the electric machine, to provide a path for fluid flow. Because the fluid cooling system is a stand-alone system, it can be easily added to the components of an existing (e.g., air-cooled) electric machine, without specialized tools.

According to an aspect of the present disclosure, the pipes 12 of the cooling system have a size and shape which allows insertion into the axial cavities 8, such as through-holes, of the stator core 5. The pipes 12 may have sufficient length so that both ends of each pipe 12 protrude from the stator core 5 when the pipes 12 are positioned in the axial cavities (through-holes) 8.

In an example aspect of the disclosure, the pipes 12 are cylindrical. This has the advantage that specially shaped pipes are not required.

According to an aspect of the present disclosure, the material for the pipes 12 is a mainly a material having suitable thermal conductivity. Examples of a suitable material are aluminum alloy, stainless steel or copper and copper nickel alloys.

The number of pipes 12 used for the fluid cooled electric machine is not particularly limited. For example, the fluid cooling system may include four pipes 12. If the shape of the cross section of the outer periphery of the stator core 5 is square or approximately square, as shown in FIG. 2, one pipe 12 can be located near each corner of the square. However, to provide higher cooling capacity, two, three or more pipes 12 could be provided near each corner of the square. Alternatively, the pipe diameter can be increased to provide higher cooling capacity. The shape of the cross section of the outer periphery of the stator core 5 is not limited to a square or approximately square shape, and for example, a round shape may be employed. Other arrangements of the pipes 12 are also possible, such as an even distribution of the pipes around the periphery of the stator core.

The present disclosure includes two collector bodies 13,14. One collector body 13 is mounted, as a separate piece, between one end of the stator core 5 and one end shield 6. The other collector body 14 is mounted, as a separate piece, between the other end of the stator core 5 and the other end shield 7.

Because the collector bodies 13,14 of the present disclosure are separate pieces from the end shields 6,7, the cooling fluid does not have to flow through the end shields. Therefore, the end shields do not require dedicated chambers or holes for fluid flow. Also, the end shields do not have to be made of a special material such as cast iron for hydraulic applications. Instead, the end shields can be made of a material such as aluminum alloy, which is lighter, and easier to manufacture. As a result, the fluid cooled electric machine of the present disclosure can use the same end shields as existing designs of air cooled electric machines.

According to an aspect of the present disclosure, the material of the collector body is a material having suitable thermal conductivity. Examples of a suitable material are aluminum alloy or stainless steel.

The shape of the collector bodies 13,14 is not particularly limited, and may be selected in view of the shape of the stator core 5, end shields 6,7, and pipes 12. For example, if the outer periphery of the stator core has an approximately square cross-sectional shape, the collector bodies may also have an outer periphery with a corresponding approximately square cross-sectional shape. However, other shapes such as a round or oval cross-sectional shape may also be selected.

Each collector body 13,14 includes collector chambers 20. Each pipe 12 is mounted in an axial cavity 8 of the stator core 5, and interconnects a collector chamber 20 of the first collector body 13 and a collector chamber 20 of the second collector body 14.

In this way, a path can be formed for the cooling fluid to flow from one collector chamber 20 of one collector body 13,14, though the pipe 12, to the other collector chamber 20 of the other collector body 13,14.

The number of collector chambers 20 is not particularly limited. For example, if the stator core 5 has an approximately square cross-sectional shape, and the pipes are arranged near the corners of the square, each collector body may have one collector chamber 20 near each corner of the square. In this case, each collector body will have a total of 4 collector chambers.

According to an aspect of the present disclosure, the first end 6 shield is mountable to the first end of the stator core 5, and the second end shield 7 is mountable to the second end of the stator core 5. In a previously existing design of an air cooled electric machine, which has no fluid cooling system, the end shields are mounted onto the ends of the stator core. In this aspect, the collector bodies 13,14 are configured to be mounted between the stator core and end shields of an existing air cooled design, so that each end shield is mountable to its respective collector body, or to its respective end of the stator core.

In this way, the fluid cooled electric machine of the present disclosure can use the same end shields and the same stator of an existing design of an air cooled electric machine, without modification. This allows a manufacturer of electric machines to flexibly offer both air cooled and fluid cooled electric machines, based on the same air cooled design, at low cost.

According to an aspect of the present disclosure, the first and second collector bodies 13,14 include connecting holes 16 which connect one end of a pipe 12 to the collector chamber 20 of the first collector body 13, and the other end of the pipe 12 to the collector chamber 20 of the second collector body 14. These connecting holes 16 allow for easy connection between the pipes 12 and the collector chambers 20.

According to an aspect of the present disclosure, the pipes and collector bodies are connected in a fluid-sealed state. In the present application, "fluid-sealed" means that cooling fluid can be made to flow under pressure through the cooling system, without leaking to the outside of the cooling system.

According to an aspect of the present disclosure, each connecting hole 16 includes a seal ring 18. The seal rings are one means of providing a fluid-sealed connection between the collector chambers 20 and the pipes 12. A soft material of a seal ring 18 allows and ensures the proper self-alignment between the pipes 12, at their outer diameter, and the connecting holes 16.

According to an aspect of the present disclosure, the seal rings are disposed in an inner groove 17 of the connecting holes 16. The grooves 17 hold the seal rings 18 in place. By providing the grooves 17 in the connecting holes 16, instead of on the pipe 12, it is possible to use pipes having a thinner wall. Thinner pipe walls allow for more efficient heat transfer and better cooling.

The material of the seal rings 18 is not particularly limited, provided that it can form a suitable seal between the connecting holes 16 and the pipes 12. Examples of suitable materials are synthetic rubbers with good proprieties of compression and heat resistance.

According to an aspect of the present disclosure, the connecting holes 16 are connection openings extending from the collector chamber 20 to the stator-facing side of the respective collector body 13,14, wherein the pipe 12 is inserted into the connection opening and is thereby connected to the collector chamber 20.

The number of connecting holes 16 is not particularly limited. For example, there may be one, two, three or more connecting holes 16 provided for one collector chamber 20. In this way, it is possible to connect more than one pipe 12 to each collector chamber 20, which can provide increased flow of cooling fluid.

According to an aspect of the present disclosure, the first and second collector bodies 13,14 each include a fluid channel 21 which forms a fluid path interconnecting a pair of collector chambers 20 of the respective collector body 13,14. The number of fluid channels 21 for each collector body 13,14 is not particularly limited, and may be appropriately set depending on the desired fluid flow path. Also, each collector body 13,14 may have a different number of fluid channels 21.

According to an aspect of the present disclosure, at least one of the collector bodies 13,14 includes a fluid inlet 22 and a fluid outlet 23. The fluid inlet 22 and the fluid outlet 23 may include a plug-in nipple. The fluid inlet 22 and fluid outlet 23 may be provided on either of the collector bodies 13,14.

According to another aspect of the present disclosure, the fluid inlet 22 may be provided on one of the collector bodies 13,14, and the fluid outlet 23 may be provided on the other of the collector bodies 13,14.

According to an aspect of the present disclosure, the position of the fluid inlet 22 and the fluid outlet 23 can be changed by changing the orientation at which the collector body is mounted to the stator. For example, the fluid inlet 22 and the fluid outlet 23 can be positioned at the upper side of the electric machine, or at the lower side of the electric machine. Also, by reversing the collector bodies 13 and 14, the fluid inlet 22 and the fluid outlet 23 can be positioned at the non-drive end or drive end of the electric machine. This allows a flexible positioning of fluid inlet 22 and a fluid outlet 23, in accordance with pipes provided for cooling fluid at the user's location.

According to an aspect of the present disclosure, the cooling fluid is water. Other cooling fluids which can be used are coolant fluids for industrial applications.

According to an aspect of the present disclosure, the collector bodies 13,14 and pipes 12 form a closed fluid-sealed path extending from the fluid inlet 22, through the collector bodies 13,14 and pipes 12, to the fluid outlet 23. The number and arrangement of pipes 12, and collector chambers 20, connecting holes 16, fluid channels 21 and the like may be suitably set to provide a flow of cooling fluid as required to achieve acceptable cooling performance.

According to an aspect of the present disclosure, the fluid flows axially from a collector chamber 20 of one collector body 13,14, to a collector chamber 20 of the other collector body 13,14, through one or more pipes 12. Because the pipes 12 are mounted in the axial cavities 8 of the stator core 5, the fluid flowing through the pipes 12 can cool the stator core 5.

According to an aspect of the present disclosure, the fluid flows from one collector chamber 20 of one collector body 13,14, to another collector chamber 20 of the same collector body 13,14, through a fluid channel 21. In this way the fluid channel 21 can connect collector chambers 20 of the same collector body 13,14. Such a flow of fluid within the collector bodies 13,14 can cool the ends of the stator core 5, and also cool the end shields 6,7.

According to an aspect of the present disclosure, the flow of cooling fluid follows a zigzag path from the fluid inlet 22 to the fluid outlet 23. This means that the fluid flow in the pipe(s) 12 connected to one collector chamber 20 of one collector body 13,14, will be in the opposite direction to the fluid flow in the pipe(s) 12 connected to adjacent collector chambers 20 of the same collector body 13,14.

For example, the fluid may flow axially from a first collector chamber 20 of a first collector body 13 to second collector chamber 20 of a second collector body 14 in a first axial direction (for example, from a drive end to a non-drive end of the electric machine), through one or more pipe(s) 12 connecting the first and second collector chambers 20. Then, the fluid flows from the second collector chamber 20, through a fluid channel 21, to a third collector chamber 20 of the same collector body 14. Then, the fluid flows axially from the third collector chamber 20 of the second collector body 14 to a fourth collector chamber 20 of the first collector body 13 in a second axial direction (for example, from a non-drive end to a drive end of the machine) through pipe(s) 12 connecting the third and fourth collector chambers 20. The fourth collector chamber 20 is adjacent to the first collector chamber 20 of the first collector body 13, and the second axial direction of fluid flow in the pipes 12 connected to the fourth collector body 20, is opposite to the first axial direction of fluid flow, through the pipes 12 connected to the adjacent first collector chamber 20.

By such a flow of cooling fluid, it is possible to efficiently circulate fluid through a large portion of the stator core 5, and efficiently cool the electric machine.

Figure 7:
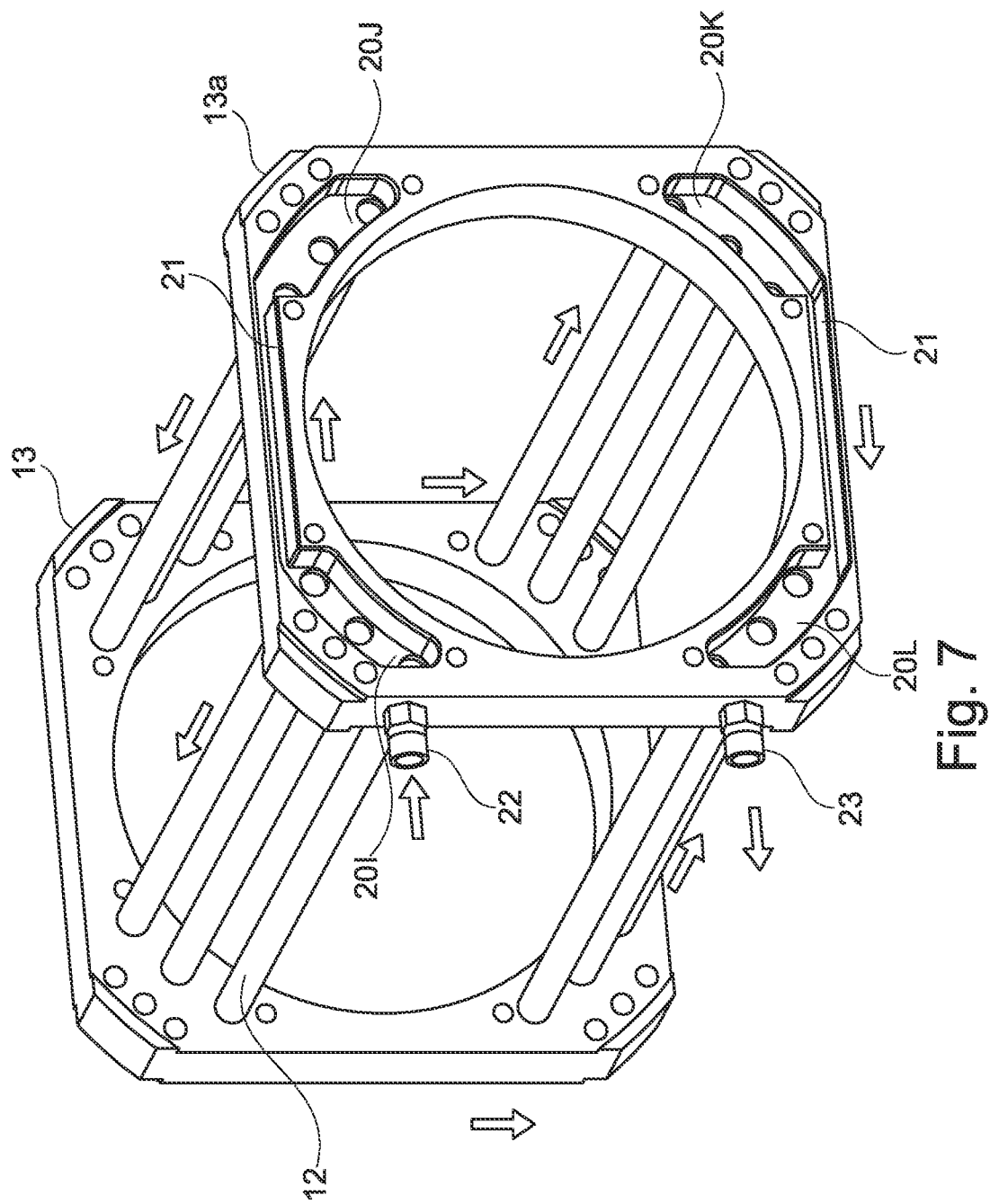
FIG. 7 is a cooling system according to an aspect of the present disclosure.

However, the fluid flow is not limited to the path described above, and the stand-alone cooling system 10 for cooling fluid flow can flexibly provide other options for cooling fluid flow. For example, as shown in FIG. 7, in another aspect, two collector bodies 13,13a can have the same arrangement of collector chambers 20 and fluid channels 21 as shown for the collector body 13 in FIG. 5A. In this case, the fluid inlet 22 and fluid outlet 23 are positioned on the collector body 13a. Then, by appropriately arranging the orientations of the collector bodies 13,13a, it is possible to provide a flow of cooling fluid on the upper side of the electric machine, left and right, from non-drive end to drive end, and on the lower side of the electric machine, from drive end to non-drive end, left and right.

Namely, as shown by the arrows in FIG. 7, cooling fluid flows through the fluid inlet 22 at the upper side of the electric machine, into a first collector chamber 20I. The cooling fluid will also flow from the collector chamber 20I to the second collector chamber 20J of collector body 13a via the fluid channel 21. Collector chambers 20I and 20J are in the collector body 13a at the upper side of the electric machine. From collector chambers 20I and 20J, the cooling fluid flows, in the same direction, as shown by the arrows, to two respective collector chambers at the upper side of the collector body 13, via pipes 12. The fluid then flows via fluid channels 21 to two collector chambers at the lower side of the collector body 13. Then, the fluid flows via pipes 12 into collector chambers 20K and 20L at the lower side of the collector body 13a, and flows out of the fluid outlet 23 at the lower side of the collector body 13a.

A method of producing a fluid cooled electric machine according to the present disclosure includes the steps of mounting the pipes 12 in the axial cavities 8 of the stator core 5, mounting the first collector body 13 to a first end of the stator core 5, and mounting the second collector body 14 to a second end of the stator core 5, so that the pipes 12 interconnect the collector chambers 20 of the first and the second collector bodies 13,14, and mounting the first end shield 6 to the first collector body 13, and mounting the second end shield 7 to the second collector body 14. In this manner, the cooling system can also be included in an existing (e.g., air-cooled) electric machine.

The present disclosure provides a fluid cooled electric machine which can be readily manufactured by adding simple components to an existing air cooled design, with a minimum of specialized components or specialized tools, and with simple production steps.

While the disclosure has been illustrated and described in detail in the drawings and foregoing description, such illustration and description are to be considered illustrative or exemplary and not restrictive. The disclosure is not limited to the disclosed embodiments. Other variations to the disclosed embodiments can be understood and effected by those skilled in the art and practicing the claimed disclosure, from a study of the drawings, the disclosure, and the appended claims. In the claims, the word "comprising" does not exclude other elements or steps, and the indefinite article "a" or "an" does not exclude a plurality. Any reference signs in the claims should not be construed as limiting the scope.

What is claimed is:

1. An electric machine comprising a shaft extending along an axis of the machine, a rotor rotationally coupled to the shaft, a stator radially surrounding the rotor and having a stator core, first and second end shields mounted at opposite ends of the electric machine in the axial direction, the shaft mounted to the first end shield, and a fluid cooling system for cooling the electric machine, the stator core having a plurality of axial cavities in an existing air cooling of the electric machine, the fluid cooling system comprising:
   first and second collector bodies, each defining a plurality of collector chambers for cooling fluid; and
   a plurality of pipes,
   wherein the first collector body, which defines the collector chambers, is mounted, as a separate piece, between a first end of the stator core and the first end shield,
   wherein the second collector body, which defines the collector chambers, is mounted, as a separate piece, between a second end of the stator core and the second end shield,
   wherein each pipe is mounted in the axial cavities of the stator core, and interconnects a collector chamber of the first collector body and a collector chamber of the second collector body,
   wherein the end shields comprise bearing seats rotationally supporting the rotor,
   wherein the first collector body is mounted to a first end of the stator core, and the second collector body is mounted to a second end of the stator core,
   wherein the first end shield is mounted to the first collector body, and the second end shield is mounted to the second collector body,
   wherein the fluid cooling system is configured to be retrofitted to the existing air cooling of the electric machine while the stator, the rotor, and the end shields remain the same, and
   wherein at least one of the collector bodies comprises an inlet of the fluid cooling system and an outlet of the fluid cooling system, and the collector bodies and the pipes form a closed fluid-sealed path extending from the inlet, through the collector bodies and the pipes, to the outlet, such that a continuous fluid flow path is defined between the inlet, the collector chamber of the first collector body, the pipes, the collector chamber of the second collector body, and the outlet.

2. The electric machine according to claim 1, wherein the first end shield is mountable to the first end of the stator core, and the second end shield is mountable to the second end of the stator core.

3. The electric machine according to claim 1, wherein the first and second collector bodies each comprise connecting holes that connect one end of a pipe to the collector chamber of the first collector body, and the other end of the pipe to the collector chamber of the second collector body.

4. The electric machine according to claim 1, wherein the pipes and the collector bodies are connected in a fluid-sealed state.

5. The electric machine according to claim 3, wherein each connecting hole comprises a seal ring.

6. The electric machine according to claim 5, wherein each seal ring is disposed in an inner groove of the connecting hole.

7. The electric machine according to claim 1, wherein the pipes are cylindrical.

8. The electric machine according to claim 1, wherein the electric machine is an electric motor.

9. The electric machine according to claim 1, wherein the cooling fluid is water.

10. The electric machine according to claim 1, wherein the first and second collector bodies each comprise a fluid channel that forms a fluid path interconnecting a pair of collector chambers of the respective collector body.

11. The electric machine according to claim 3, wherein the connecting holes are connection openings extending from the collector chamber to the stator-facing side of the respective collector body, wherein the pipe is inserted into the connection opening and is thereby connected to the collector chamber.

12. A method of producing a fluid cooled electric machine comprising a fluid cooling system according to claim 1, comprising the steps of:
- mounting the pipes in the axial cavities of the stator core;
- mounting the first collector body to a first end of the stator core;
- mounting the second collector body to a second end of the stator core, so that the pipes interconnect the collector chambers of the first and the second collector bodies;
- mounting the first end shield to the first collector body; and
- mounting the second end shield to the second collector body.

13. A fluid cooled electric machine comprising a shaft extending along an axis of the machine, a rotor rotationally coupled to the shaft, a stator radially surrounding the rotor and having a stator core, first and second end shields mounted at opposite ends of the electric machine in the axial direction, the shaft mounted to the first end shield, and a fluid cooling system configured to cool the electric machine, the stator core defining a plurality of axial cavities in an existing air cooling of the electric machine, the fluid cooling system comprising:
- first and second collector bodies, each defining a plurality of collector chambers for cooling fluid and at least one fluid channel connecting two of the plurality of collector chambers; and
- a plurality of pipes,
- wherein the first collector body, which defines the collector chambers, is mounted, as a separate piece, between a first end of the stator core and the first end shield,
- wherein the second collector body, which defines the collector chambers, is mounted, as a separate piece, between a second end of the stator core and the second end shield,
- wherein each pipe is mounted in the axial cavities of the stator core, and interconnects the plurality of collector chambers of the first collector body and the plurality of collector chambers of the second collector body,
- wherein the first collector body is mounted to a first end of the stator core, and the second collector body is mounted to a second end of the stator core,
- wherein the first end shield is mounted to the first collector body, and the second end shield is mounted to the second collector body,
- wherein the fluid cooling system is configured to be retrofitted to the existing air cooling of the electric machine while the stator, the rotor, and the end shields remain the same, and
- wherein at least one of the collector bodies comprises an inlet of the fluid cooling system and an outlet of the fluid cooling system, and the collector bodies and the pipes form a closed fluid-sealed path extending from the inlet, through the collector bodies and the pipes, to the outlet, such that a continuous fluid flow path is defined between the inlet, the plurality of collector chambers of the first collector body, the pipes, the plurality of collector chambers of the second collector body, and the outlet.

* * * * *